Sept. 25, 1962  H. C. FLINT ET AL  3,055,653
SPRING UNITS AND CUSHION CONSTRUCTED THEREFROM
Filed Jan. 25, 1960  3 Sheets-Sheet 1
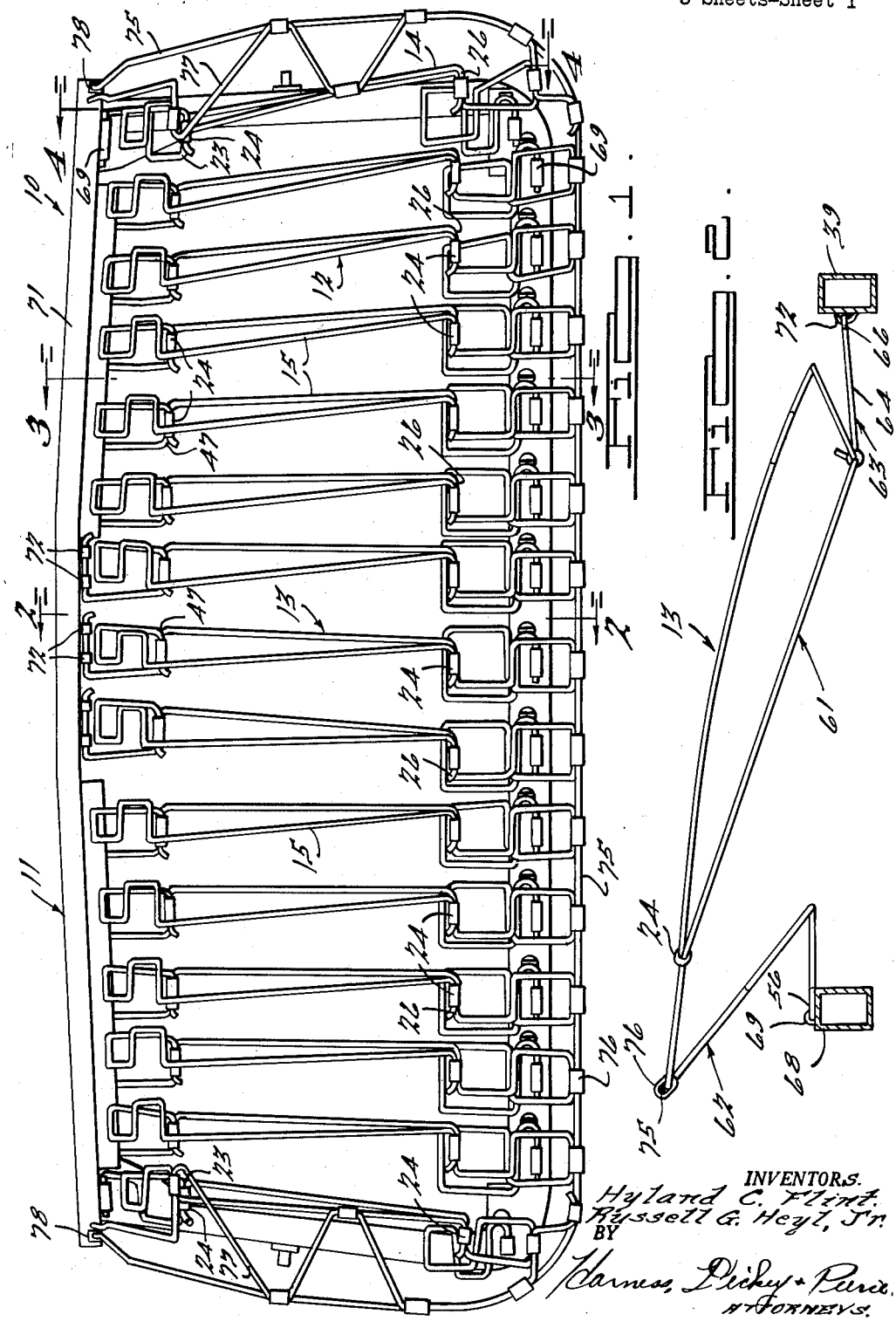
INVENTORS.
Hyland C. Flint.
Russell G. Heyl, Jr.
BY
Harness, Dickey & Pierce.
ATTORNEYS.

Sept. 25, 1962   H. C. FLINT ET AL   3,055,653
SPRING UNITS AND CUSHION CONSTRUCTED THEREFROM
Filed Jan. 25, 1960   3 Sheets-Sheet 2
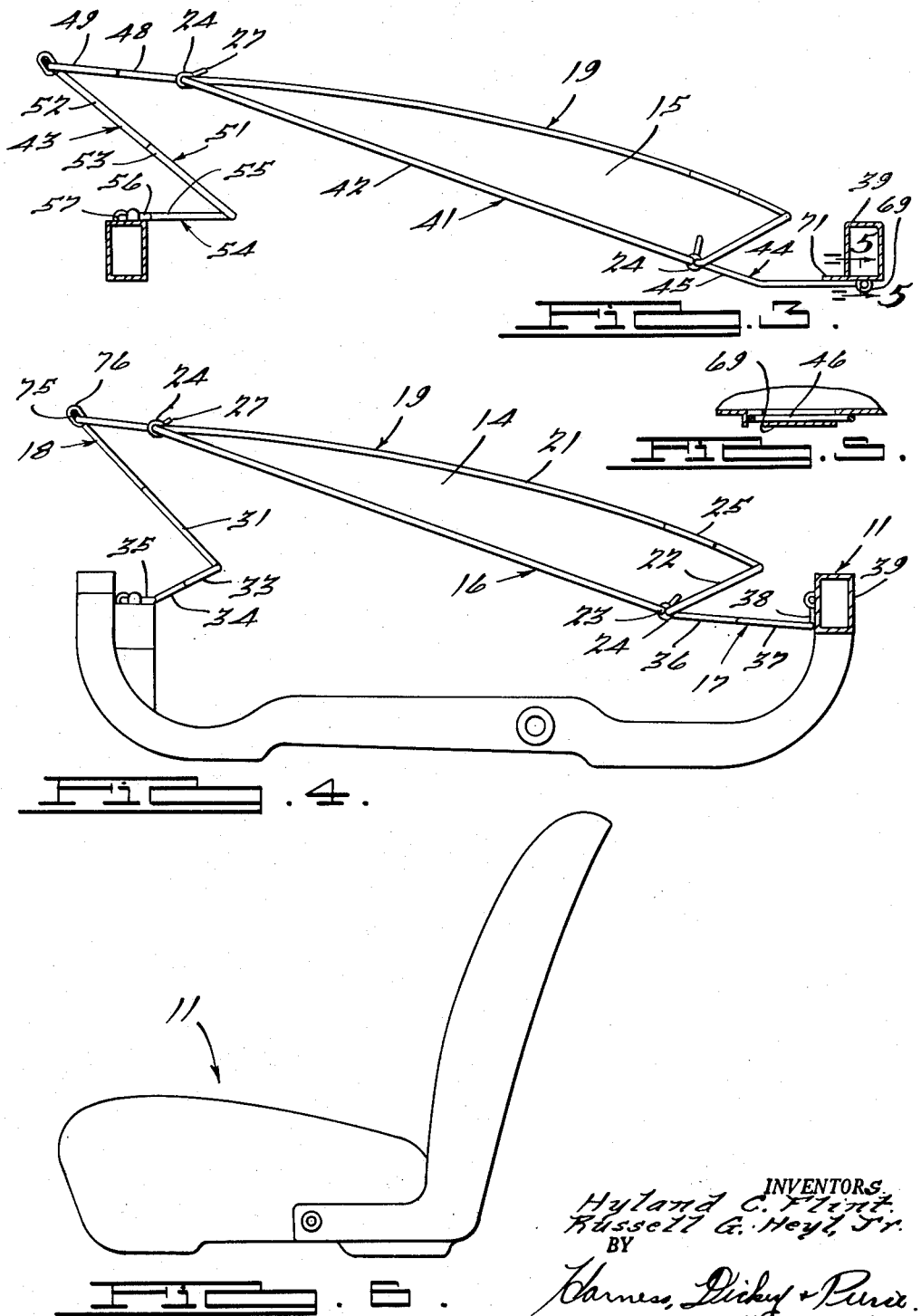
INVENTORS.
Hyland C. Flint.
Russell G. Heyt, Jr.
BY
Harness, Dickey & Pierce.
ATTORNEYS.

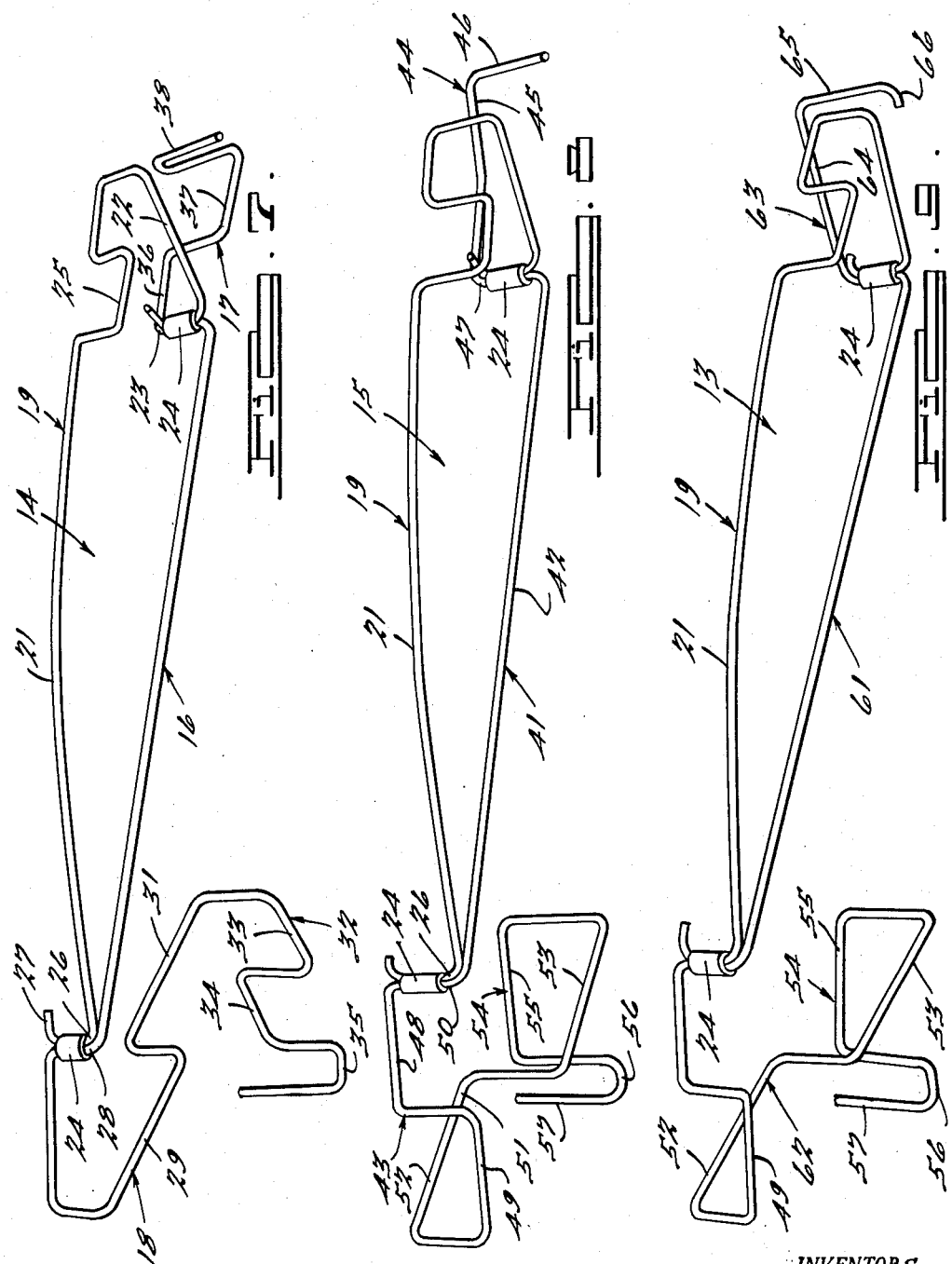

United States Patent Office 3,055,653
Patented Sept. 25, 1962

3,055,653
SPRING UNITS AND CUSHION CONSTRUCTED THEREFROM
Hyland C. Flint, Novi, and Russell G. Heyl, Jr., Birmingham, Mich., assignors to American Metal Products Company, Detroit, Mich., a corporation of Michigan
Filed Jan. 25, 1960, Ser. No. 4,455
23 Claims. (Cl. 267—107)

This invention relates to seat cushion constructions, and particularly to a seat cushion and the spring units provided therein.

In the patent to H. C. Flint, No. 2,684,844, issued July 27, 1954, a spring unit is illustrated made of wire formed into loops of different dimension for the purpose of controlling the contour of the supporting portion of the spring strip when loaded. The wire at both ends of the strip is extended downwardly and further formed into loops having an attaching end by which the load supporting portion of the strip is maintained above the seat frame to provide comfort not only from the contouring of the loaded area but also from the resilient support at each end of the strip. A bracing element extended from the rear downwardly extending supporting portion to a forward portion of the load supporting portion of the strip to control the contouring and limit the deflection thereof.

The present invention pertains to a similar spring unit having two portions but arranged so that the supporting ends are in extension of a bracing rod portion and a load supporting portion is secured thereto, with the rear end disposed above the rear supporting end of the unit. In this relationship, the base portion of the unit may be made from a heavier gauge of wire than the top attached load supporting portion thereof.

In a seat cushion spring assembly, the central portion of the seat is provided with spring units of dissimilar gauge for the base and the load supporting elements thereof, while the end units which are similar in construction may be made from heavier gauges of wire. For example, the central units may have the base portion constructed of a wire of nine-gauge, while the load supporting element mounted thereabove could be made from ten-gauge wire. The end units could have the base portion constructed of eight-gauge wire while the top portion in pickaback relation thereto is constructed of a nine-gauge wire. Thus, the contouring, the degree of deflection and the amount of support are completely controlled throughout the width of the seat and further strengthened at the side edges through the use of wires of heavier gauge.

A further novelty of the spring units resides in their attaching ends, the front portions of the springs being secured against pivoting while the central rear springs of the cushion unit located above the tunnel portion of the vehicle floor have a pivoted relation to the rear frame member. The spring units at the sides of the central units have the rear end portions mounted to deflect downwardly but are limited in upward movement by a projecting flange on the frame. The endmost spring units, which may be of heavier gauge wires, as pointed out hereinabove, have the rear end disposed in fixed relation to the frame. The different securing means at the rear of the units are necessary and desirable to provide comfort at the rear edge of the seat cushion and the proper contour of the load bearing area of the assembly.

Accordingly, the main objects of the invention are: to provide a spring unit which has a base portion and a portion disposed thereabove which is pivoted thereto to form the load supporting portion of the unit; to provide a compound unit having a base portion containing end sections which are attachable to a frame and a contouring portion disposed above the base portion between the end sections, the portions being made of wire of different gauges; to provide a compound spring unit for a frame having an end portion which is bent upwardly to abut against a supporting wall so as to prevent the adjacent portion from deflecting downwardly and also with end portions which permit the spring to pivot freely or within a restricted area; to provide a seat cushion with spring units which are similar in construction having a heavy base portion and a lighter load bearing section which has different types of supporting ends so that certain ends may pivot freely within a restricted area or which are fixed against pivotal movement, and, in general, to provide spring units for a seat cushion which are simple in construction and economical of manufacture.

Other objects and features of novelty of the invention will be specifically pointed out or will become apparent when referring, for a better understanding of the invention, to the following description taken in conjunction with the accompanying drawings, wherein:

FIGURE 1 is a view in elevation of a spring seat cushion having spring units thereon embodying features of the present invention;

FIG. 2 is an enlarged sectional view of the structure illustrated in FIG. 1, taken on the line 2—2 thereof;

FIG. 3 is an enlarged sectional view of the structure illustrated in FIG. 1, taken on the line 3—3 thereof;

FIG. 4 is an enlarged sectional view of the structure illustrated in FIG. 1, taken on the line 4—4 thereof;

FIG. 5 is an enlarged sectional view of the structure illustrated in FIG. 3, taken on the line 5—5 thereof;

FIG. 6 is a view in elevation of a complete seat structure having a seat cushion and a back cushion disposed in unit relation to each other;

FIG. 7 is an enlarged plan view in perspective of the spring unit illustrated in FIG. 4;

FIG. 8 is an enlarged plan view in perspective of the spring unit illustrated in FIG. 3, and FIG. 9 is an enlarged plan view in perspective of the spring unit illustrated in FIG. 2.

In the spring cushion structure 10 illustrated in FIG. 1, a base frame 11 has a plurality of spring units 12 secured thereto. The spring units 12 are similar in construction but are slightly modified, as will be evident from comparing the units 13 at the center of the frame, units 14 at the ends thereof, and units 15 intermediate the units 13 and 14. The unit 14 is illustrated in FIGS. 4 and 7 as having a base element 16 which has a rear extending end section 17 and a front section 18, all formed as a unit from a single piece of wire. A load bearing element 19 has a bearing section 21 and a rear downwardly and forwardly extending supporting section 22, the end of which is pivoted to an offset portion 23 of the base element 16 by a banding clip 24. The section 21 of the load bearing element is straight except at the rear where an offset loop 25 provides greater flexibility to the strip where a greater deflection gives greater comfort to the load bearing end of the unit. The forward end of the load bearing element 19 is offset laterally at 26 and reversely bent at 27, with the offset portion 26 secured by a band 24 to an offset portion 28 in the base element 16. It will be noted in this arrangement that the base portion is made of wire of heavier gauge than the top section 19 which is pivotally mounted thereon.

The forward section 18 of the base element 16 is of V shape, having oppositely disposed loops 29 and 31 in a rearwardly and downwardly extending portion and oppositely extending loops 33 and 34 in a forwardly extending portion 32 which terminates in an attaching loop 35 disposed at an angle to the loops 33 and 34. The rear end section 17 of the base supporting element 16 is provided with oppositely disposed loops 36 and 37. On the end of the latter loop, an attaching loop 38 is provided, disposed substantially at right angles thereto in position to engage the front face of the rear rail element 39 when attached thereto.

Inwardly from the end spring units 14, the spring units 15 are illustrated in FIGS. 3 and 8 as having a base element 41, which is similar to the element 16, having a central straight portion 42, a front end section 43, and a rear end section 44. The rear end section has a single loop laterally facing 45 including an attaching end 46 and a laterally offset end 47 to which the offset portion 26 of the load bearing element 19 is secured by a band 24. The front extending portion 43 has laterally facing opposite loop portions 48 and 49, to an offset portion 50 of which the laterally offset end 26 of the load bearing element 19 is secured by a band 24. A downwardly and rearwardly extending arm portion 51 has oppositely disposed loops 52 and 53 from which a forwardly extending arm portion 54 is provided having a U-shaped loop 55 and an attaching loop 56 containing a securing end 57 for the front of the spring unit.

The central spring unit 13 is illustrated in FIGS. 2 and 9 as having a base supporting element 61 provided with a forward V-shaped section 62 which is of the same construction as the section 43 of the unit 19 illustrated in FIGS. 4 and 8. The rear end section 63 of the load supporting element 61 has a U-shaped loop 64 containing an attaching end 65, the latter of which has its end reversely bent at 66. The loading bearing element 19, as described above, is secured to offset portions of the base supporting element 61 by the bands 24. Otherwise the construction of the base element 61 is the same as the base element 41 of the spring unit 15 above described.

It may be desirable to have the wire forming the base supporting element 61 heavier than the wire of the base supporting elements 16 and 41 of the associated units. In the same arrangement, the wire of the load bearing element 19 of the central unit 14 could be heavier than that of the load bearing elements 19 of the units 13 and 15. As an example, in the seat construction illustrated in FIG. 1, the end units 14 could have the base supporting elements 61 constructed of eight-gauge wire, with the load bearing element 19 mounted thereon made of nine-gauge wire. The elements 13 and 15 could have the base supporting elements 16 and 42 respectively made of nine-gauge wire, while the elements 19 mounted thereon could be made of ten-gauge wire. It is to be understood that this is by way of example and all of the elements may be made of the same size of wire or from wire of dissimilar gauge to meet the requirement of the seat unit, conforming to the weight of the load to be supported, the action produced to the spring units due to the movement of the vehicle, and the desired contour of the units which provides comfort to the cushion.

In examining the spring assembly of FIG. 1, it will be noted that the top elements 19 are disposed at an angle to the central portion of the base elements 16 when mounted thereabove so as to avoid contact therewith when the top elements 19 are deflected. The top elements, therefore, do not require a sound-deadening material which was employed on the bracing elements illustrated in the above mentioned patent. In this arrangement, the end sections of the base element of the spring units are joined to the rear frame element 39 and the front frame element 68, and the load bearing element 19 is supported on the base element between the end sections. The laterally extending end portions of the front end loops 56 project within tunnel sections 69 provided along the top surface of the front frame element 68. As illustrated in FIGS. 2, 3 and 4, the loop portion 56 rests upon the top surface of the frame element 68 and provides a support for the front end of the base elements against downward pivoted movement.

The endmost spring units 14 have the laterally extending end portions 38 projecting into tunnel elements 69 located on the forward face of the rear frame member 39. The adjacent spring elements 15 have the laterally extending end portions 46 secured in a tunnel element 69 on the bottom face of the rear frame member 39 so as to permit the section 44 to deflect downwardly while being prevented from moving upwardly by a flange 71 which extends forwardly from the bottom face of the rear frame element 39. The central spring elements 13 have a laterally disposed end 65 secured in U-shaped fingers 72 struck out from the front face of the rear frame element 39 or otherwise provided. The ends 65 are disposed within the fingers 72 which are thereafter clinched over to form a tunnel, as clearly illustrated in FIG. 2. In other words, the three central spring units illustrated in the spring assembly of FIG. 1 are pivoted to the rear frame element 39, the spring units 15 on each side thereof are pivoted to the rear frame element 39 for downward deflection while prevented from upward pivotal movement, and the end spring units 14 are rigidly secured to the rear frame element 39 against downward deflection.

A border wire 75 is secured about the assembly by the clamping bands 76 and filler bracing elements 77 are mounted between the load supporting portion 19 of the endmost spring units 14 and the side portions of the border wire. The ends of the border wire are secured to the ends of the rear frame element 39 in a suitable manner, herein illustrated as by having an offset end extending into an aperture 78 in the top surface of the rear frame element.

What is claimed is:

1. In a spring unit, a base element made of wire having a straight central section with laterally facing loop portions at each end forming supporting end sections, and a load supporting element secured to the base element and disposed thereabove.

2. In a spring unit, a base element made of wire having a straight central section with laterally facing loop portions at each end forming supporting end sections, and a load supporting element secured to the base element and disposed thereabove, the load supporting element being of lighter gauge wire than the base element and having a laterally disposed forwardly extending end section.

3. In a spring unit, a base element made of wire having a straight central section with laterally facing loop portions at each end forming supporting end sections, a load supporting element secured to the base element and disposed thereabove, the end of the load supporting element having a laterally disposed forward end section in engagement with said base element, and a band for securing said end section to the base element.

4. In a spring unit, a base element made of wire having a straight central section with reversely bent loop portions at each end forming supporting end sections, and a load supporting element secured to the base element and disposed thereabove, the end of the loop at the rear section of the base element extending laterally to form an attaching finger which is reversely bent at the end for locking it against substantial endwise movement when in secured position.

5. In a spring unit, a base element made of wire having a straight central section and end sections extending therefrom formed by loops having a laterally extending portion at the ends of the central section, attaching means at the ends of the front and rear sections, a load supporting element made of wire and having a straight section and a rear downwardly and forwardly extending end portion, and means for securing the ends of the load supporting element to said laterally extending portions at the end of the central section of the base element to support the load supporting element upon the base element.

6. In a spring unit, a base element made of wire having a straight central section and end sections extending therefrom formed by loops having a laterally extending portion at the ends of the central section, attaching means at the ends of the front and rear sections, a load supporting element made of wire and having a straight section and a rear downwardly and forwardly extending end portion, and means for securing the ends of the load supporting element to said laterally extending portions at the end of the central section of the base element to support the load supporting element upon the base element, said load supporting element being made of lighter gauge wire than the base element.

7. In a spring unit, a base element made of wire having a straight central section and end sections extending therefrom and having a laterally extending portion at the ends of the central section, attaching means at the ends of the front and rear sections, a load supporting element made of wire and having a straight section and a rear downwardly and forwardly extending end portion, and means for securing the ends of the load supporting element to said laterally extending portions at the end of the central section of the base element to support the load supporting element upon the base element, the straight sections of the base element and the load supporting element being disposed in angular relation so as not to engage each other when the unit is deflected under load.

8. In a spring unit, a base element made of wire having a straight central section and end sections extending therefrom and having a laterally extending portion at the ends of the central section, attaching means at the ends of the central section, attaching means at the ends of the front and rear sections, a load supporting element made of wire and having a straight section and a forwardly and downwardly extending rear end portion, and means for securing the ends of the load supporting element to said laterally extending portions at the end of the central section of the base element to support the load supporting element upon the base element, said front section having rearwardly and forwardly extending portions disposed in V relationship, with the end of the forwardly extending portion having attaching means by which the front end of the unit is secured to a frame.

9. In a spring unit, a base element made of wire having a straight central section and end sections extending therefrom and having a laterally extending portion at the ends of the central section, a load supporting element made of wire and having a load bearing section and a rear downwardly and forwardly extending end portion, and means for securing the ends of the load supporting element to said laterally extending portions at the end of the central section of the base element to support the load supporting element upon the base element, said front section having rearwardly and forwardly extending portions disposed in V relationship, with the end of the forwardly extending portion having attaching means by which the front end of the unit is secured to a frame, the rear section of the base element having an attaching end by which the rear end of the unit is secured to a rear frame element.

10. In a spring unit, a base element made of wire having a straight central section and end sections extending therefrom and having a laterally extending portion at the ends of the central section, a load supporting element made of wire and having a load bearing section and a rear downwardly and forwardly extending end portion, and means for securing the ends of the load supporting element to said laterally extending portions at the end of the central section of the base element to support the load supporting element upon the base element, said front section having rearwardly and forwardly extending portions disposed in V relationship, with the end of the forwardly extending portion having attaching means by which the front end of the unit is secured to a frame, the rear section of the base element having an attaching end by which the rear end of the unit is secured to a rear frame element, said attaching means at the rear element being an end of a laterally facing U-shaped loop which extends substantially normal to the end of the rear base section.

11. In a spring unit, a base element made of wire having a straight central section and end sections extending therefrom and having a laterally extending portion at the ends of the central section, a load supporting element made of wire and having a load bearing section and a rear downwardly and forwardly extending end portion, and means for securing the ends of the load supporting element to said laterally extending portions at the end of the central section of the base element to support the load supporting element upon the base element, said front section having rearwardly and forwardly extending portions disposed in V relationship, with the end of the forwardly extending portion having attaching means by which the front end of the unit is secured to a frame, the rear section of the base element having an attaching end by which the rear end of the unit is secured to a rear frame element, in pivotal relation thereto.

12. In a seat cushion construction, a base frame having a rear frame element and a front frame element, spring units between the front and rear frame elements, at least two of said spring units having a base element containing a central section and a front and rear section, the front section of said unit having a downwardly extending frontwardly facing V-shaped supporting portion with attaching means on the end thereof, means on the front frame element for securing the attaching means thereto in a manner to prevent the downward pivotal movement thereof, and attaching means on the end of the rear section for engagement with the rear frame element in a manner to prevent the pivoting of the rear section thereon.

13. In a seat cushion construction, a base frame having a rear frame element and a front frame element, spring units between the front and rear frame elements, said spring units having a base element containing a central section and a front and rear section, the front section of said units having a downwardly extending frontwardly facing V-shaped supporting portion with attaching means on the end thereof, means on the front frame element for securing the attaching means thereto in a manner to prevent the downward pivotal movement thereof, and attaching means on the end of the rear sections for engagement with the rear frame element, said attaching means on the rear section of the end spring units on the frame being a laterally facing U-shaped loop disposed substantially normal to the rear end section.

14. In a seat cushion construction, a base frame having a rear frame element and a front frame element, spring units between the front and rear frame elements, said spring units having a base element containing a central section and a front and rear section, the front section of said units having a downwardly extending frontwardly facing V-shaped supporting portion having attaching means on the ends thereof, means on the front frame element for securing the attaching means thereto in a manner to prevent the downward pivotal movement thereof, attaching means on the ends of the rear sections for engagement with the rear frame element, said attaching means on the rear section of the end spring units of the cushion being a laterally facing U-shaped loop disposed substantially normal to the rear end section, and means for securing the attaching means of the rear section of the end spring units to the front wall of the rear frame element, with the loop disposed thereagainst to prevent the pivotal movement of the rear end section.

15. In a seat cushion construction, a base frame having a rear frame element and a front frame element, spring units between the front and rear frame elements, said spring units having a base element containing a central section and a front and rear section, the front section of said units having a downwardly extending frontwardly facing V-shaped supporting portion having attaching means on the ends thereof, means on the front frame element for securing the attaching means thereto in a manner to prevent the downward pivotal movement thereof, attaching means on the ends of the rear sections for engagement with the rear frame element, said attaching means on the rear section of the end spring units of the cushion being a laterally facing U-shaped loop disposed substantially normal to the rear end section, means for securing the attaching means of the rear section of the end spring units to the front wall of the rear frame element with the loop disposed thereagainst to prevent the pivotal movement of the rear end section, said attaching means on the rear end of the intermediate spring units embodying a laterally extending wire section, tunnellike elements on the bottom face of the rear frame element into which the wire sections project for downward pivotal movement, and a flange extending forwardly of the bottom of the rear frame unit against which the rear sections abut to limit the upward pivotal movement of the latter said rear end sections.

16. In a seat cushion construction, a base frame having a rear frame element and a front frame element, spring units between the front and rear frame elements, said spring units having a base element containing a central section and a front and rear section, the front section of said units having a downwardly extending frontwardly facing V-shaped supporting portion having attaching means on the ends thereof, means on the front frame element for securing the attaching means thereto in a manner to prevent the downward pivotal movement thereof, attaching means on the ends of the rear sections for engagement with the rear frame element, said attaching means on the rear section of the end spring units of the cushion being a laterally facing U-shaped loop disposed substantially normal to the rear end section, means for securing the attaching means of the rear section of the end spring units to the front wall of the rear frame element with the loop disposed thereagainst to prevent the pivotal movement of the rear end section, said attaching means on the rear end of the intermediate spring units embodying a laterally extending wire section, tunnellike elements on the bottom face of the rear frame element into which the wire sections project for downward pivotal movement, a flange extending forwardly of the bottom of the rear frame unit against which the rear sections abut to limit the upward pivotal movement of the latter said rear end sections, the central spring units having the rear section provided with a laterally disposed wire section, and means on the forward face of the rear frame element for supporting the last said wire sections for pivotal movement.

17. In a seat cushion construction, a base frame having a rear frame element and a front frame element, spring units between the front and rear frame elements, said spring units having a base element containing a central section and a front and rear section, the front section of said units having a downwardly extending frontwardly facing V-shaped supporting portion having attaching means on the ends thereof, means on the front frame element for securing the attaching means thereto in a manner to prevent the downward pivotal movement thereof, attaching means on the ends of the rear sections for engagement with the rear frame element, said attaching means on the rear section of the end spring units of the cushion being a laterally facing U-shaped loop disposed substantially normal to the rear end section, means for securing the attaching means of the rear section of the end spring units to the front wall of the rear frame element with the loop disposed thereagainst to prevent the pivotal movement of the rear end section, said attaching means on the rear end of the intermediate spring units embodying a laterally extending wire section, tunnellike elements on the bottom face of the rear frame element into which the wire sections project for downward pivotal movement, a flange extending forwardly of the bottom of the rear frame unit against which the rear sections abut to limit the upward pivotal movement of the latter said rear end sections, the central spring units having the rear section provided with a laterally disposed wire section, means on the forward face of the rear frame element for supporting the last said wire sections for pivotal movement, a border wire extending across the front of the front sections of the spring units and along the side thereof having the ends secured at the ends of the rear frame element, and bands securing the front sections to the front portion of the border wire.

18. In a seat cushion construction, a base frame having a rear frame element and a front frame element, spring units between the front and rear frame elements, said spring units having a base element containing a central section and a front and rear section, the front section of said units having a downwardly extending frontwardly facing V-shaped supporting portion having attaching means on the ends thereof, means on the front frame element for securing the attaching means thereto in a manner to prevent the downward pivotal movement thereof, attaching means on the ends of the rear sections for engagement with the rear frame element, said attaching means on the rear section of the end spring units of the cushion being a laterally facing U-shaped loop disposed substantially normal to the rear end section, means for securing the attaching means of the rear section of the end spring units to the front wall of the rear frame element with the loop disposed thereagainst to prevent the pivotal movement of the rear end section, said attaching means on the rear end of the intermediate spring units embodying a laterally extending wire section, tunnellike elements on the bottom face of the rear frame element into which the wire sections project for downward pivotal movement, a flange extending forwardly of the bottom of the rear frame unit against which the rear sections abut to limit the upward pivotal movement of the latter said rear end sections, the central spring units having the rear section provided with a laterally disposed wire section, means on the forward face of the rear frame element for supporting the last said wire sections for pivotal movement, a border wire extending across the front of the front sections of the spring units and along the side thereof having the ends secured at the ends of the rear frame element, bands securing the front sections to the front portion of the border wire, and wire filler elements secured to the end spring units and to the side portion of the border wire to fill the spaces therebetween.

19. In a cushion construction, a base frame having front and rear frame elements, a plurality of spring units extending between said elements, each unit having a V-shaped front end terminating in attaching means which are secured to the front frame element against downward pivotal movement and rear end sections which are secured to the rear frame member, the endmost spring units having the rear ends fixed thereto, the central spring units having the rear ends in pivotal relation thereto, and the intermediate spring units between the endmost spring units and the central spring units having the rear ends secured to the rear frame member for downward pivotal movement with means for limiting the upward pivotal movement thereof.

20. In a cushion construction, a base frame having front and rear frame elements, a plurality of spring units extending between said elements, each unit having a V-shaped front end terminating in attaching means which are secured to the front frame element against downward pivotal movement and rear end sections which are secured to the rear frame member, the endmost spring units having the rear ends fixed thereto, the central spring units having the rear ends in pivotal relation thereto, and the intermediate spring units between the endmost spring units and the central spring units having the rear ends secured to the rear frame member for downward pivotal movement with means for limiting the upward pivotal movement thereof, a border wire extending around said spring units at the front and sides of the assembly, and bands securing the front portion of the border wire to the front ends of the spring units.

21. In a cushion construction, a base frame having front and rear frame elements, a plurality of spring units extending between said elements, each unit having a V-shaped front end terminating in attaching means which are secured to the front frame element against downward pivotal movement and rear end sections which are secured to the rear frame member, the endmost spring units having the rear ends fixed thereto, the central spring units having the rear ends in pivotal relation thereto, and the intermediate spring units between the endmost spring units and the central spring units having the rear ends secured to the rear frame member for downward pivotal movement with means for limiting the upward pivotal movement thereof, a border wire extending around said spring units at the front and sides of the assembly, bands securing the front portion of the border wire to the front ends of the spring units, and wire filler elements secured to said spring units and to the side portions of the border wire to fill the spaces therebetween.

22. In a cushion construction, a base frame having front and rear frame elements, a plurality of spring units extending between said elements, each unit having a V-shaped front end terminating in attaching means which are secured to the front frame element against downward pivotal movement and rear end sections which are secured to the rear frame member, the endmost spring units having the rear ends fixed thereto, the central spring units having the rear ends in pivotal relation thereto, and the intermediate spring units between the endmost spring units and the central spring units having the rear ends secured to the rear frame member for downward pivotal movement with means for limiting the upward pivotal movement thereof, said spring units having a base element comprising a central straight section and projecting end sections, and a load bearing element having a straight section disposed above the straight section of said base element and having end portions pivotally secured at the ends of said straight sections of the base element.

23. In a cushion construction, a base frame having front and rear frame elements, a plurality of spring units extending between said elements, each unit having a V-shaped front end terminating in attaching means which are secured to the front frame element against downward pivotal movement and rear end sections which are secured to the rear frame member, the endmost spring units having the rear ends fixed thereto, the central spring units having the rear ends in pivotal relation thereto, and the intermediate spring units between the endmost spring units and the central spring units having the rear ends secured to the rear frame member for downward pivotal movement with means for limiting the upward pivotal movement thereof, said spring units having a base element comprising a central straight section and projecting end sections, and a load bearing element having a straight section disposed above the straight section of said base element and having end portions pivotally secured at the ends of said straight sections of the base element, the wire of said base and load supporting elements being of different gauge, with the base element of heavier gauge than said load supporting element.

References Cited in the file of this patent
UNITED STATES PATENTS

| | | |
|---|---|---|
| 2,669,290 | Neely | Feb. 16, 1954 |
| 2,684,844 | Flint et al. | July 28, 1954 |
| 2,685,330 | Handren et al. | Aug. 3, 1954 |
| 2,731,075 | Flint | Jan. 17, 1956 |
| 2,764,227 | Williams et al. | Sept. 25, 1956 |
| 2,790,488 | Flint | Apr. 30, 1957 |
| 2,817,390 | Crites | Dec. 24, 1957 |
| 2,835,314 | Neely | May 20, 1958 |
| 2,864,434 | Flint | Dec. 16, 1958 |